United States Patent
Holmes et al.

(10) Patent No.: US 11,386,397 B2
(45) Date of Patent: Jul. 12, 2022

(54) INTELLIGENT EVENT TIME BRIDGE ACROSS DOMAINS

(71) Applicant: Microsoft Technology Licensing, LLC, Redmond, WA (US)

(72) Inventors: William Hart Holmes, Seattle, WA (US); Srinivasa Reddy Manda, Issaquah, WA (US); Mohit Mehtani, Redmond, WA (US); Jaya Matthew, Seattle, WA (US); Chanchai Ravindra Kariwala, Bellevue, WA (US); Charlie Ricafort Chung, Tacoma, WA (US); Tor-Helge Persett, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 141 days.

(21) Appl. No.: 16/675,054

(22) Filed: Nov. 5, 2019

(65) Prior Publication Data
US 2021/0133693 A1 May 6, 2021

(51) Int. Cl.
*G06Q 10/10* (2012.01)
*G06F 21/31* (2013.01)
*G06F 21/12* (2013.01)

(52) U.S. Cl.
CPC ....... *G06Q 10/1095* (2013.01); *G06F 21/123* (2013.01); *G06F 21/31* (2013.01); *G06Q 10/103* (2013.01)

(58) Field of Classification Search
CPC ............. G06Q 10/1095; G06Q 10/103; G06Q 10/1093; G06Q 10/109; G06F 21/123; G06F 21/31

(Continued)

(56) References Cited

U.S. PATENT DOCUMENTS 7,685,206 B1 * 3/2010 Mathew ................ H04L 63/105
707/785
10,339,503 B1 * 7/2019 Roth .................. G06Q 10/1095
(Continued)

OTHER PUBLICATIONS

Chanan Glezer, A conceptual model of an interorganizational intelligent meeting-scheduler (IIMS), The Journal of Strategic Information Systems, vol. 12, Issue 1, Mar. 2003, pp. 47-70. (Year: 2003).*

(Continued)

*Primary Examiner* — Charles Guiliano
*Assistant Examiner* — Letoria G Knight

(57) ABSTRACT

In non-limiting examples of the present disclosure, systems, methods and devices for providing cross-domain access to calendar availability are presented. A request to schedule an event may be received. The request may comprise an identity of an organizer user account, the organizer user account associated with a first domain, and an identity of an invitee user account, the invitee user account associated with a second domain. An importance level of the organizer user account to the invitee user account may be determined. A determination may be made as to whether the organizer user account has access to events in an electronic calendar associated with the invitee user account based on the importance level. One or more events that the organizer account has access to may be surfaced in an event scheduling assistant user interface associated with the organizer user account.

20 Claims, 13 Drawing Sheets

(58) Field of Classification Search
USPC .......................................................... 705/7.19
See application file for complete search history.

(56) References Cited

U.S. PATENT DOCUMENTS

| | | | |
|---|---|---|---|
| 2006/0200374 A1 | 9/2006 | Nelken et al. | |
| 2010/0004971 A1* | 1/2010 | Lee .................. | G06Q 10/06311 |
| | | | 705/7.18 |
| 2011/0071878 A1* | 3/2011 | Gingras ............. | G06Q 10/1093 |
| | | | 705/7.18 |
| 2014/0282828 A1* | 9/2014 | Stuntebeck ............. | G06F 21/62 |
| | | | 726/1 |
| 2014/0310044 A1* | 10/2014 | Meltzer .............. | G06Q 10/1095 |
| | | | 705/7.19 |
| 2015/0058057 A1* | 2/2015 | Egan .................. | G06Q 10/1095 |
| | | | 705/7.19 |
| 2015/0324756 A1* | 11/2015 | Hughes .............. | G06Q 10/1095 |
| | | | 705/7.19 |
| 2016/0357761 A1 | 12/2016 | Siracusa et al. | |
| 2017/0236081 A1* | 8/2017 | Grady Smith ....... | G06Q 10/067 |
| | | | 705/7.36 |
| 2020/0341593 A1* | 10/2020 | Han ................... | G06Q 10/1095 |
| 2021/0056513 A1* | 2/2021 | Lee .......................... | G06N 5/04 |

OTHER PUBLICATIONS

"International Search Report and Written Opinion Issued in PCT Application No. PCT/US20/056227", dated Feb. 5, 2021, 11 Pages.

* cited by examiner

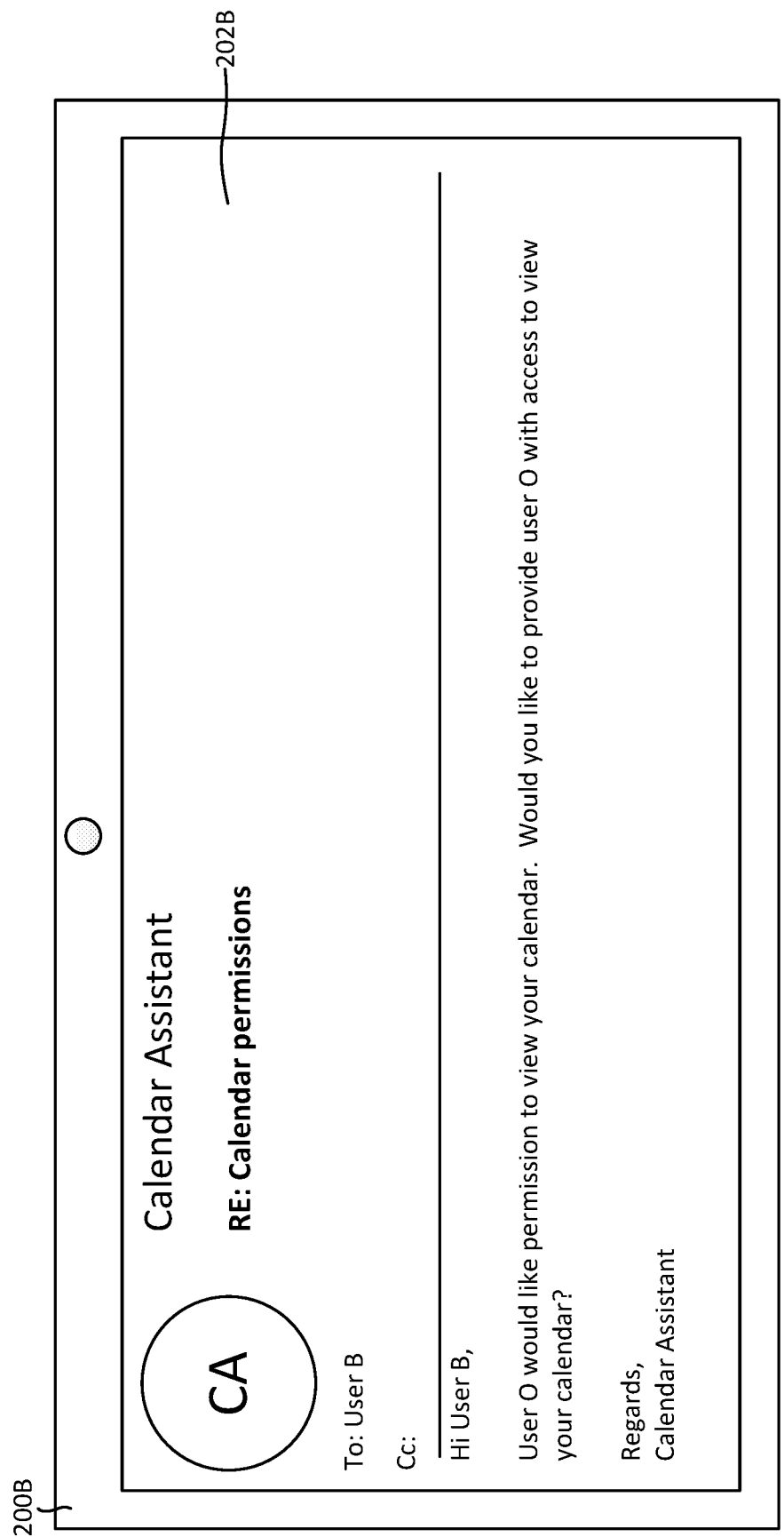

FIG. 3

Calendar Permissions: User O  ✕

This user has the following permissions

| Calendar | User has access to my calendar based on category ▶ | — 302

☐ User is category P1
☐ User is category P2
☑ User is category P3 | Edit Permissions — 304

☐ Automatically send a message to user O summarizing these permissions
☐ User can see my private items
☑ User can displace my events based on category P3 permissions
☑ Provide all users in [same organization as user O] with same access

[ OK ]   [ Cancel ]

US 11,386,397 B2

INTELLIGENT EVENT TIME BRIDGE ACROSS DOMAINS

BACKGROUND

Electronic calendars and messaging applications that are integrated with those electronic calendars are ubiquitous in business environments and are increasingly being used for the scheduling of personal events. A user in an organization may provide other users within that organization with access to her calendar. Those other users may then more easily determine when the user is available or busy for meeting booking purposes.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for providing cross-domain access to electronic calendars. The access and/or amount of calendar information that is shared with a user may be automatically determined based on one or more factors. Those factors may include collaboration signals (e.g., messages exchanged between users, meetings that include users, etc.), hierarchy of users in their respective organizations, and social media graphs, for example. In some examples, a sharing user may interact with sharing settings and provide access to her electronic calendar based on those settings. For example, a user may indicate that a first set of information is available for sharing with users outside of her domain, while a second set of information is not available for sharing with users outside of her domain. In some example, the sharing user may set, or a cross-domain calendar application service may automatically determine, sharing categories for different users. Those categories may have different types of information that can be obtained from the sharing user's electronic calendar and utilized for scheduling purposes. In some examples, the sharing categories may relate to an importance of the other users to the sharing user. In other examples, the sharing categories may relate to a level of trust that the invitee has for the other users.

BRIEF DESCRIPTION OF THE DRAWINGS

Non-limiting and non-exhaustive examples are described with reference to the following figures:

FIG. 2B illustrates a computing device that has received an email requesting access to a user's electronic calendar.

FIG. 3 illustrates an exemplary settings menu for adjusting access to cross-domain calendar content.

DETAILED DESCRIPTION

Figure 1:
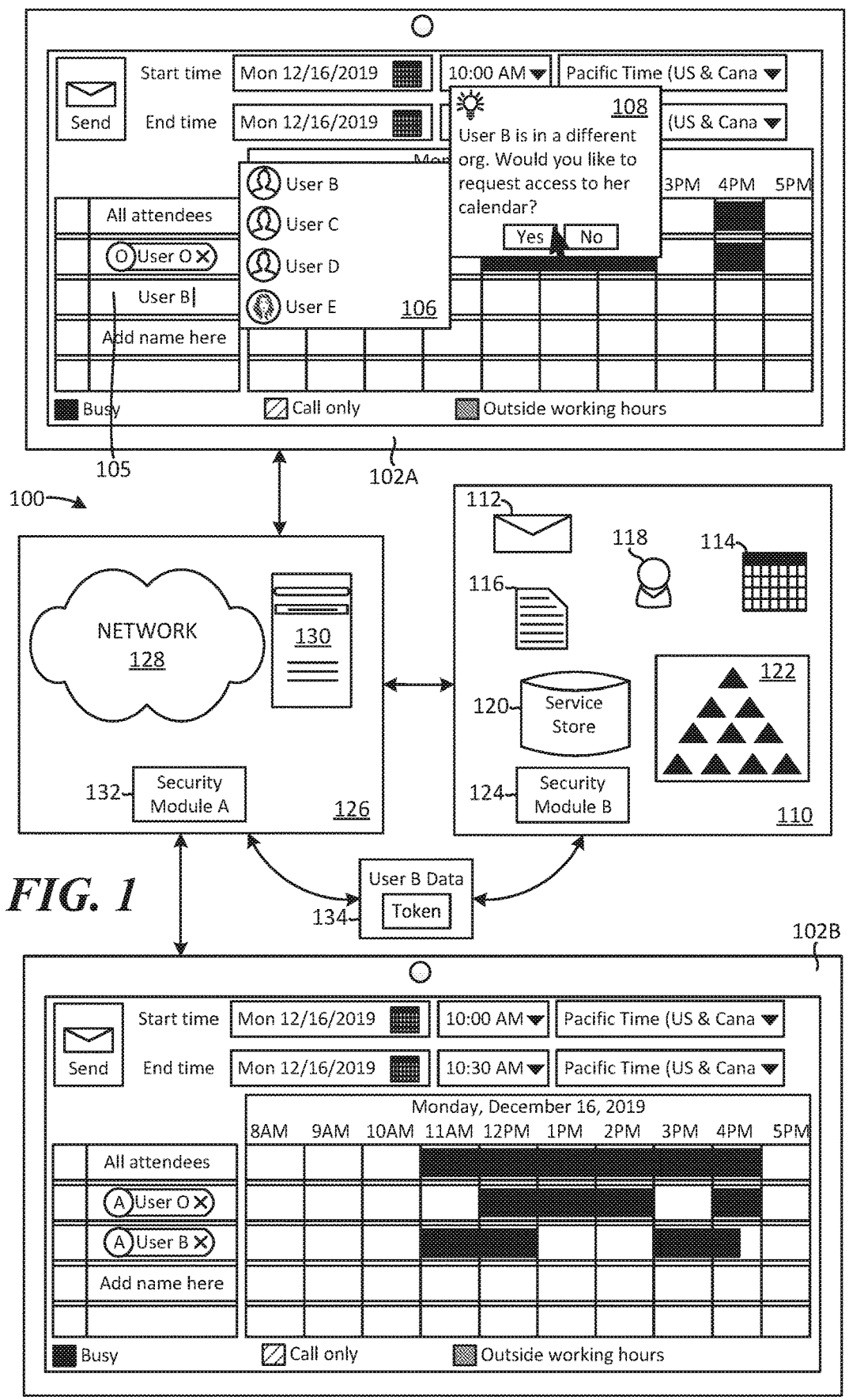
FIG. 1 is a schematic diagram illustrating an example distributed computing environment for providing cross-domain access to calendar content.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of the present disclosure describe systems, methods and devices for providing cross-domain access to electronic calendars. As used herein, "domain" may refer to a user's electronic alias and/or a user's organization. For example, a first domain may comprise an email address with domain @[company1.com] and a second domain may comprise an email address with domain @[company2.com]. According to examples, a first user account may request access to an electronic calendar associated with a second user account. The request may originate from an electronic calendar application associated with the first user account, an event scheduling assistant associated with the first user account, a digital assistant, an email application associated with the first user account, or a stand-alone request interface, for example.

In some examples, the second user account may have settings that have been interacted with by the second user that allow users outside of her domain to access certain electronic calendar details. Those calendar details may include whether the second user is free or busy for authorized time periods. In some examples, the details that a user may access from the second user's electronic calendar may be based on an importance level of a requesting user that is determined by a cross-domain calendar application service. The cross-domain calendar application service may analyze various factors in making a determination as to a requesting user's relative importance to a sharing user. Those factors may include collaboration signals (e.g., messages exchanged between users, meetings that include users, etc.), hierarchy of users in their respective organizations, and social media graphs, for example. Therefore, the cross-domain calendar application service may provide calendar event information from the sharing user's electronic calendar at a level that corresponds to a requesting user's determined importance level to the sharing user. The sharing user may manually adjust the sharing level and/or details that are shared with individual users and/or multiple users at a given time (e.g., users in a same domain, users in a same organization, users having similar characteristics, etc.).

According to some examples, a sharing user account (e.g., a user that provides calendar accessibility information to be available to another user account) may provide different accessibility information (e.g., free/busy) to users that are deemed to be important to the sharing user than are deemed to be less important to the sharing user. For example, a sharing user account may manually or automatically indicate to a cross-domain calendar application service that a requesting account is an important contact (e.g., a high value customer, an important vendor, etc.). In such in instance, when the requesting user account requests access to the sharing user account's calendar information, the cross-domain calendar application service may indicate that a period of time is free to the sharing user account that would otherwise be indicated as busy and/or unavailable to a less important contact/user account.

The systems, methods, and devices described herein provide technical advantages for providing access to electronic calendars. Processing costs (e.g., CPU cycles) are reduced via the mechanisms described herein at least in that meetings can be scheduled more efficiently via shared calendar information in electronic event scheduling assistants, rather than having scheduling users email back and forth with potential attendees to determine viable meeting times. Generally, sharing a first user's calendar availability with other users outside of that first user's organization/domain would require tenant admins on both user sides go through a complex process of setting up relationships and syncing free/busy in each user's calendar application. That is, when determining whether calendar availability could be shared across domains, previous solutions would require that a sharing relationship be authorized at the tenant level for both the requesting side and the requestor side in order to establish an organization/domain relationship between the two. Under such regimes, when a request for availability information was made, that request would need to be routed through an auto-discovery process to determine whether there was a tenant-to-tenant relationship that had been established for the availability sharing to be authorized.

Alternatively, the mechanisms described herein remove the necessity of performing the tenancy auto-discovery process. Instead, as described herein, when a first user account associated with a first domain provides access to a second user account associated with a second domain to the first user account's calendar availability information (via settings or as automatically determined via importance level), and when the second user account requests access to that information, a token describing the second user account may be automatically generated and sent from a module on the cross-domain calendar application service on the second user account side and authorized by a module on the cross-domain calendar application service on the first user account side. If the token is authenticated on the first user account side, the first user's availability information may be provided to the second user account.

Thus, instead of going through the complex process of multi-tenancy authorizations, auto-discovery lookup, and requiring that electronic calendar sharing with other users be accomplished via administrator-tenant relationships and settings, the current mechanisms allow sharing users to automatically provide access to their electronic calendars with custom sharing settings and individualized tokens. Those settings may be automatically identified and tailored to individual users based on hierarchical organization charts, collaboration/meeting patterns between users, and/or social media graphs. By automatically determining importance levels of users and adjusting sharing settings based on those determinations, the burden of setting up sharing features for each requesting user is significantly reduced.

FIG. 1 is a schematic diagram illustrating an example distributed computing environment 100 for providing cross-domain access to calendar content. Distributed computing environment 100 includes meeting organizer computing device 102A and meeting organizer computing device 102B, which are the same computing device. Distributed computing environment 100 also includes network and processing sub-environment 126 and service store sub-environment 110.

Network and processing sub-environment 126 includes network 128, by which any of the computing devices described herein may communicate with one another, and server computing device 130, which is exemplary of a cloud-computing device that may perform one or more operations described herein in relation to a cloud-based application service (e.g., a cross-domain calendar application service, an email application service, a document application service, etc.). Network and processing sub-environment 126 further includes security module A 132, which represents one or more security modules and/or security operations that may be performed by a cross-domain calendar application service to validate user account access to one or more user account calendar profiles and associated calendar data.

Service store sub-environment 110 comprises service store 120, which contains information associated with a plurality of users' electronic calendar/scheduling applications, including documents 116, user information 118, past, present, and future calendar events 114, and meeting/event invitations 112 associated with past, present and future events. Documents 116 may include productivity application documents that are stored locally to a local computing device such as computing device 102A/102B and/or one or more remote storage locations. Documents 116 may comprise one or more documents of one or more document types, including one or more of: emails, saved instant messages, word processing documents, presentation documents, spreadsheet documents, note application documents, etc.

Service store sub-environment 110 also includes hierarchical organization data 122. Hierarchical organization data 122 comprises a graphical, table, or other infrastructure for indexing organizational users (e.g., user accounts) based on their hierarchy in an organization. Hierarchical organization data 122 may include indexed hierarchies for one or more organizations. In some examples, hierarchical organization data 122 may include and/or be utilized to calculate hierarchical scores between users that are not in an organization and one or more users in a hierarchical index for the organization. The hierarchical scores may be utilized to determine a level of access to a user's electronic calendar that will be granted to an organizer/requestor user outside of an organization (e.g., in a different domain).

Server computing device 130 and an associated cross-domain calendar application service may communicate with service store 120 and obtain and analyze information included therein in performing one or more operations described herein. Service store sub-environment 110 further includes security module B 124, which represents one or more security modules and/or security operations that may be performed by a service store in association with the cross-domain calendar application service to validate user account access to one or more user account calendar profiles and associated calendar data. In this example, user B data 134 is passed from service store 120 to the cross-domain calendar application service, some of which may be provided to an organizer user's electronic calendar application. User B data 134 is passed to cross-domain calendar application based on a security token handshake between the services as illustrated by the token in user B data 134.

In this specific example, a user in a first domain (in a first organization) has opened a scheduling assistant user interface in a calendar application, which is displayed on computing device 102A. That user is the organizer user (user O). The organizer user enters the alias of a contact that she would like to schedule a meeting with. In this example, the organizer user enters text 105 "User B" in the name field of the scheduling assistant. Pop-up window 106 is then caused to be displayed, which includes selectable contact elements that have been determined to most closely correspond to text 105. Thus, selectable elements for contacts "User B", "User C", "User D", and "User E" are displayed in pop-up window 106.

In this example, the organizer user has selected the contact element corresponding to user B in pop-up window 106, which causes fly-out window 108 to be surfaced. Fly-out window 108 includes a notification that states: "User B is in a different org. Would you like to request access to her calendar?" That is, an account associated with user B (e.g., a productivity application suite account, an email account, a cloud-based service account) is not associated with a same domain and/or organization as the account associated with the organizer user (user O). In this example, the organizer user selects the "Yes" element in fly-out window 108 to initiate an access request to access user B's calendar information.

When an indication is received to request access to user B's electronic calendar, computing device 102A may send that request to the cross-domain calendar application service. In examples, the cross-domain calendar application may provide the request to the account associated with user B, and the request to grant the organizer user with access to user B's calendar may be provided to user B (e.g., in an email to user B's alias, in a pop-up window in user B's calendar application). In some examples, user B may manually adjust what, if any, calendar information to share with the requesting user account. In other examples, one or more calendar events and/or calendar event details may be automatically identified for sharing with the requesting user account. That is, in some examples, the cross-domain calendar application service may analyze one or more signals associated with the requesting user (user O) and the invitee user (user B), and a determination may be made as to an importance level that the requesting/organizer user has to the invitee user.

The determined importance level may be utilized by the cross-domain calendar application service to automatically set one or more sharing settings related to what calendar information to share with the requesting user. The importance level may be determined based on an importance score that is calculated based on a plurality of collaboration signals. The collaboration signals may include one or more of: a frequency of electronic communications between the organizer user account and the invitee user account, a number of electronic communications between the organizer user account and the invitee user account, a number of identified meetings between the organizer user account and the invitee user account, and a frequency of identified meetings between the organizer user account and the invitee user account. In additional examples, the importance level may be determined based on a hierarchical position of the organizer in the organizer's organization and/or a hierarchical position of the invitee in the invitee's organization. The hierarchical information may be identified via hierarchical organization data 122 in service store sub-environment 120. A higher importance level and/or score may result in more electronic calendar information being shared with the organizer/requestor. In still additional examples, the importance level and/or importance score may be determined based on a connection score that is calculated based on analyzing one or more connections in a social media graph of a social media service (e.g., LinkedIn). For example, the more closely related that a requesting user is in a social media graph to a requestee, the higher the importance level and/or importance score may be. In some examples, a combination of these elements may be utilized in determining an importance level and/or score for a requestor and a requestee.

In this example, a determination is made that the organizer user has a relatively low importance level in relation to user B. As such, the cross-domain calendar application service sets calendar sharing settings to only the most basic information when user B affirmatively provides user O with access to her calendar. Thus, computing device 102B displays times that user B has scheduled events in her electronic calendar in the scheduling assistant of user O. However, the displayed calendar events for user B are only indicated as being "busy" for user B. That is, user O does not have access to see whether user B has personal events scheduled or is outside working hours during those times due to the relatively low importance level that was determined. Additional calendar information may also be restricted for sharing with the organizer user as further described in the examples discussed below.

Although the request for access to a cross-domain user's calendar is discussed here as being made via an electronic scheduling assistant and an organizer user account, other request mechanisms may be utilized. For example, a separate user interface for requesting calendar permission may be provided. In another example, a calendar permission request may be made via a digital assistant. In yet other examples, a calendar permission request may be made via email. Additionally, although the request for access is generally discussed in relation to a single user account, it should be understood that the mechanisms described herein may be utilized to request and access a plurality of user accounts via a single request (e.g., every user in organization A; every user in organization B that is of X hierarchy level, etc.).

Figure 2A:
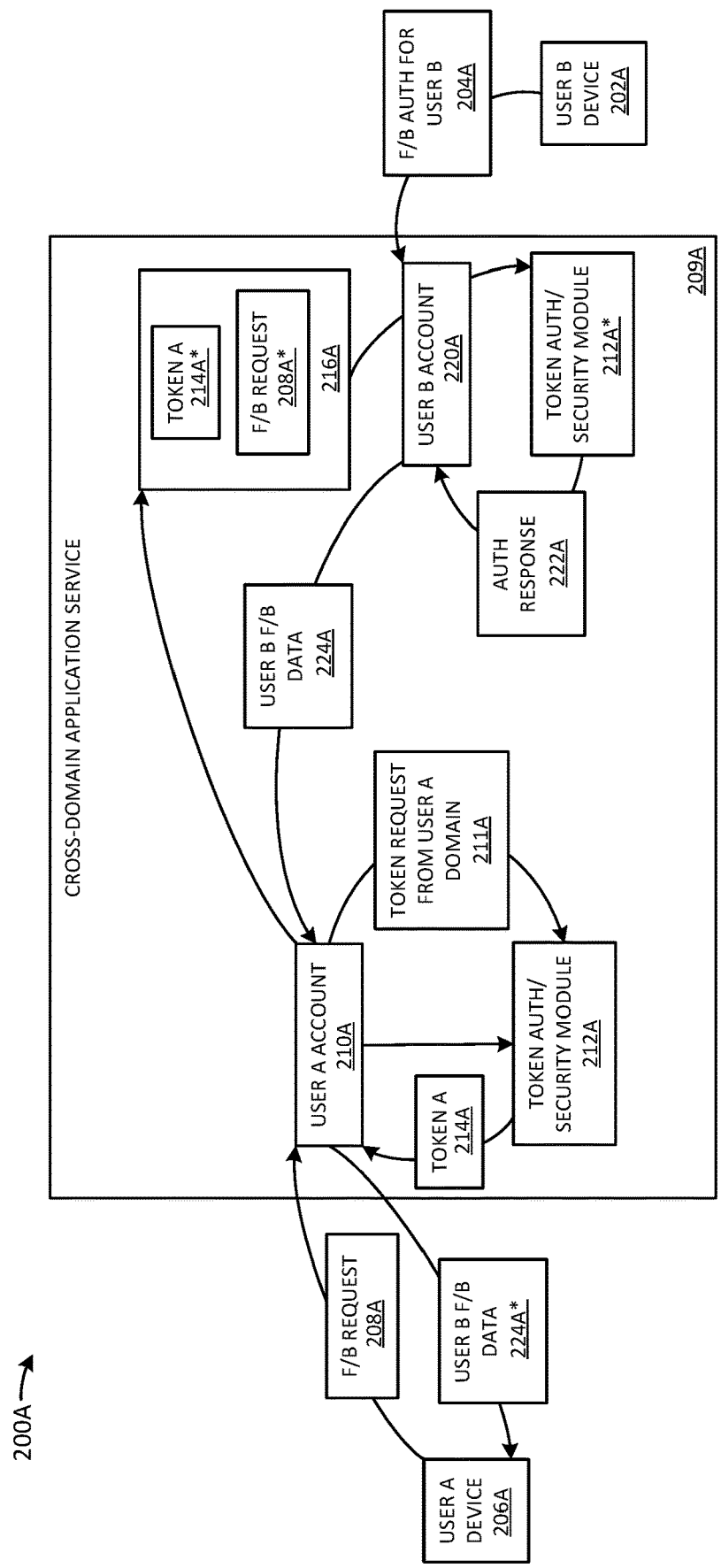
FIG. 2A illustrates a simplified diagram of a distributed computing environment for providing cross-domain access to calendar availability information.

FIG. 2A illustrates a simplified diagram of a distributed computing environment 200A for providing cross-domain access to calendar availability information. For ease of illustration, computing environment 200A includes a plurality of simplified modules, devices, and corresponding operations. It should be understood that the operations described in relation to FIG. 2A are not necessarily performed in the order described.

User B device 202A provides free/busy authorization 204A to user account B 220A in cross-domain application service 209A, which authorizes user A (e.g., an account associated with user A) to access free/busy information associated with user B (e.g., an account associated with user B).

User A device 206A sends free/busy request 208A to user A account 210A in cross-domain application service 209A. User A account 210A may then send token request 211A from user A domain to token authorization security module 212A. Token authorization security module 212A may authenticate user A, and once user A is authenticated, token authentication security module 212A may send token A 214A to user A account 210A and/or directly to user B account 220A in association with a free/busy request. This is illustrated by token/request 216A, which includes Token A 214A* and free/busy request 208A.

User B account 220A receives token/request 216A and sends it to token authorization security module 212A*, which may match token A 214A to the authorization provided by user B device 202A. Once authenticated, authorization response 222A may be sent from token authority security module 212A* to user B account 220A where the requested free/busy information is obtained for user B. That information is transferred to user A account 2210 as illustrated by user B free/busy data 224A. User B free/busy data 224A is then caused to be surfaced on user A device 206A via user B free/busy data 224A.

FIG. 2B illustrates a computing device 200B that has received an email requesting access to a user's electronic calendar. Computing device 200B displays email 202B, which is sent to user B from an electronic calendar assistant. Email 202B includes the subject "Calendar permissions", and the body states: Hi User B, User O would like permission to view your calendar. Would you like to provide user O with access to view your calendar? Regards, Calendar Assistant". User B may send an email back to the calendar assistant either approving or denying the request, and the approval or denial may be automatically updated in the cross-domain calendar application service. In some examples, user B may provide limitations on the type of calendar information that is shared with user O via instructions in a reply email. In such examples, the calendar assistant service and/or the cross-domain calendar application service may apply one or more natural language processing models to the email and determine which limitations to have applied.

An email exchange such as the one illustrated here is but one example of a mechanism by which a requestee and/or invitee user may provide authorization in response to a share calendar request. Other mechanisms may be utilized. For example, a pop-up window or separate user interface for approving a request may be surfaced on a computing device associated with the requestee and/or invitee user account.

FIG. 3 illustrates an exemplary settings menu 300 for adjusting access to cross-domain calendar content. Settings menu 300 provides mechanisms for a user to control what information may be shared with another user. In this example, the title bar of menu 300 indicates that the user's calendar information will be shared with user O.

Menu 300 includes drop-down menu 302, which provides a mechanism for indicating which type of sharing settings to apply. In this example, the option for "user has access to my calendar based on category" is selected. This "category" designation provides a mechanism for the sharing user to modify a set of calendar sharing settings based on a user's manual designation of a requesting user into one of three categories—P1 (most trusted/most access), P2 (moderate trust/moderate access), and P3 (low trust/low access). Those settings may be automatically set to the designated category level once the sharing user provides the designation of the user that the calendar information is going to be shared with. One or more of those settings may be subsequently manually adjusted by the sharing user. In this example, the sharing user has designated user O as a P3 (low trust/low access) user as illustrated by selectable designation box 304. Although in this example, the sharing user has manually selected the category designation for user O (P3), in other examples, the category designation may be automatically selected by the cross-domain calendar application service based on a determined importance level and/or importance score between the sharing user and the user that the sharing user is going to share her calendar with.

Menu 300 further includes selectable options for: (1) automatically sending a message to user O summarizing the designated permissions; (2) allowing user O to see the sharing user's private calendar items; (3) providing user O with the ability to displace the sharing user's calendar events based on the designated category type of user O (P3); and (4) providing all users in user O's organization with the same level of access to the sharing user's calendar as is being granted to user O.

Menu 300 and the settings included therein are exemplary of a mechanism that may be utilized by a sharing user to adjust calendar sharing settings. Other menu types, setting elements, and organizational schemes are within the scope of this application.

Figure 4:
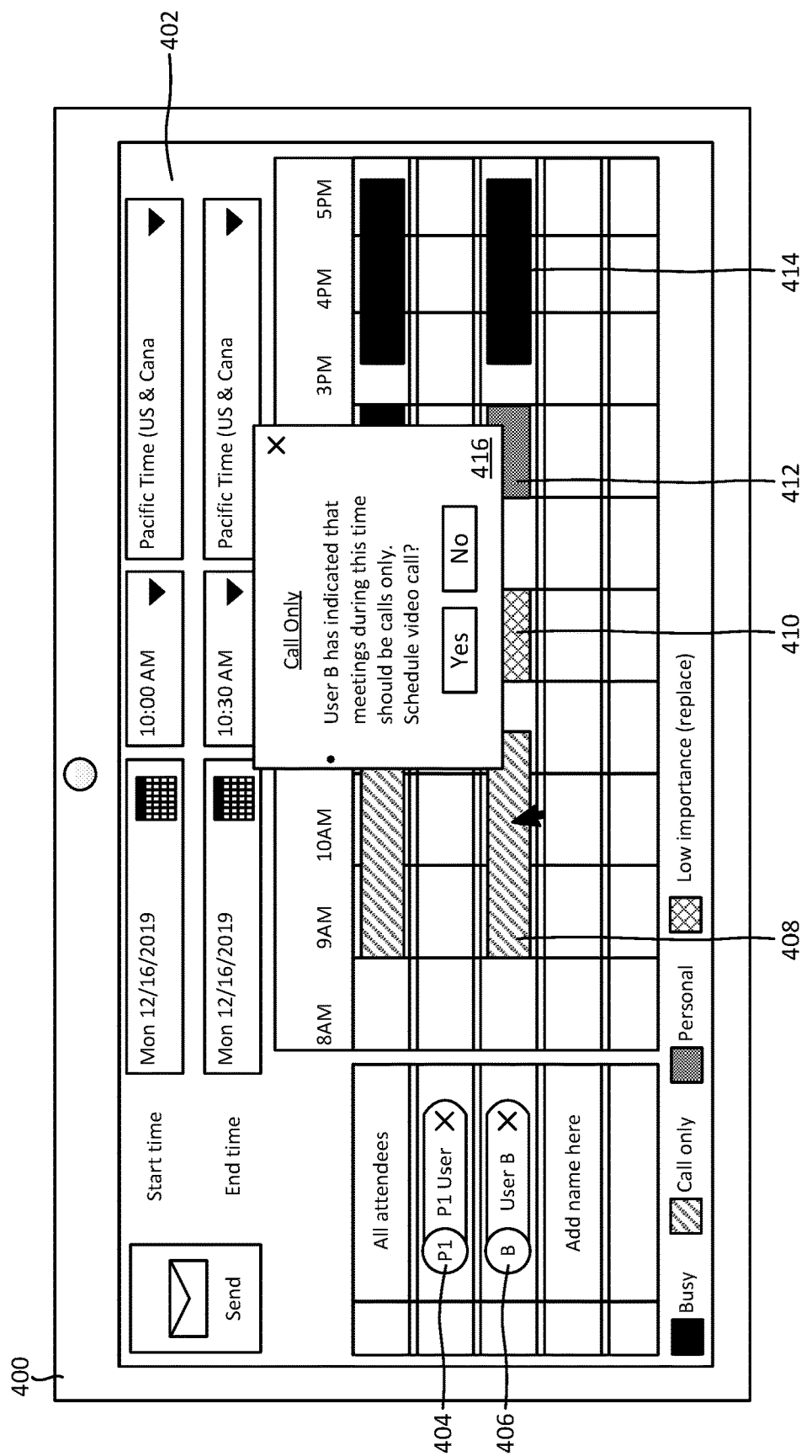
FIG. 4 illustrates a computing device displaying an electronic scheduling assistant associated with an organizer user that has a high importance level relationship with an invitee user.

FIG. 4 illustrates a computing device 400 displaying an electronic scheduling assistant 402 associated with an organizer user that has a high importance level relationship with an invitee user. The electronic scheduling assistant 402 includes a display of typical work hours for a day that the organizer user is attempting to schedule a meeting with user B. That day is Monday, Dec. 16, 2019. Scheduling assistant 402 also includes the time that the organizer user is attempting to schedule the meeting with the invitee user. That time is from 10:00 AM to 10:30 AM. The organizer user is indicated on scheduling assistant 402 by organizer user icon 404, which for exemplary purposes includes the user's category designation (P1) (most trusted/most access). Below organizer user icon 404 is invitee user icon 406, which corresponds to user B (the user that has provided P1 level access to the organizer user). To the right of each of those respective icons is event information for each respective user on Monday, Dec. 16, 2019.

The event information displayed on the organizer user's electronic scheduling assistant 402 includes information that user B has provided the organizer with access to. Electronic scheduling assistant 402 also includes an event type key on the lower portion of the display, which indicates that there are four types of event classifications that may be displayed and indicated via scheduling assistant 402. Those event classifications are: (1) busy, (2) call only, (3) personal, and (4) low importance (replace). These classifications are examples, and other classifications and calendar event information may be shared (e.g., event names, invitee/attendee information, attachments, etc.).

The low importance (replace) event classification may indicate that the importance of a meeting and/or the attendees is relatively low compared to an organizer user and that an organizer user may replace the meeting if she desires. The low importance (replace) event classification may be dynamic in nature and determined and/or assigned to an event for each organizer user based on that user's importance level and/or importance score to the corresponding invitee user. Additionally, the low importance (replace) event classification may be determined and/or assigned to an event based on one or more additional factors such as recurring weekly meetings have less priority than non-recurring meetings, and/or contextual signals from one or more of: a meeting agenda, body of a meeting invite, meeting invite attachment, and/or meeting title identified via natural language processing and/or keyword matching.

In this example, the organizer user's electronic scheduling assistant displays all of the events for the invitee's (user B) day, as well as the event-type classification for each of those events. In some examples, if the invitee had designated the organizer user with a lower category designation (e.g., P2, P3), the event-type classification information may not have been made available to the organizer user (e.g., the organizer user's scheduling assistant 402). However, because the invitee user has designated the organizer user as P1 (most trusted/most access), all of that information is relayed via scheduling assistant 402. Thus in this example, user B's schedule shows first event 408 between 9 AM and 11:30 AM and the corresponding event classification for "call only", second event 410 between 12 PM and 1 PM and the corresponding event classification "low importance (replace)", third event 412 between 2 PM and 3 PM and the corresponding event classification for "personal", and fourth event 414 between 3:30 PM and 5:30 PM and the corresponding event classification for "busy".

In this example, pop-up window 416 has been surfaced over scheduling assistant 402. Pop-up window 416 may have been automatically surfaced when the organizer user added user B as an invitee. In other examples, pop-up window 416 may be surfaced when an action is taken in the scheduling of the meeting (e.g., send element is selected; the time for the meeting is selected, etc.). Pop-up window 416 includes a selectable option to schedule the meeting as a video call. Specifically, pop-up window 416 states: "Call Only—User B has indicated that meetings during this time should be calls only. Schedule video call?" In this example, the cross-domain calendar application service has caused this option to be surfaced based partially on the P1 designation of the organizer user and the sharing of the event classification for second event 410. That is, the organizer user's scheduling assistant 402 has access to information in the invitee's calendar that indicates that the invitee will only take call request meetings during the meeting that is being scheduled, so the cross-domain calendar application service and/or scheduling assistant 402 may automatically surface the video call prompt.

Figure 5:
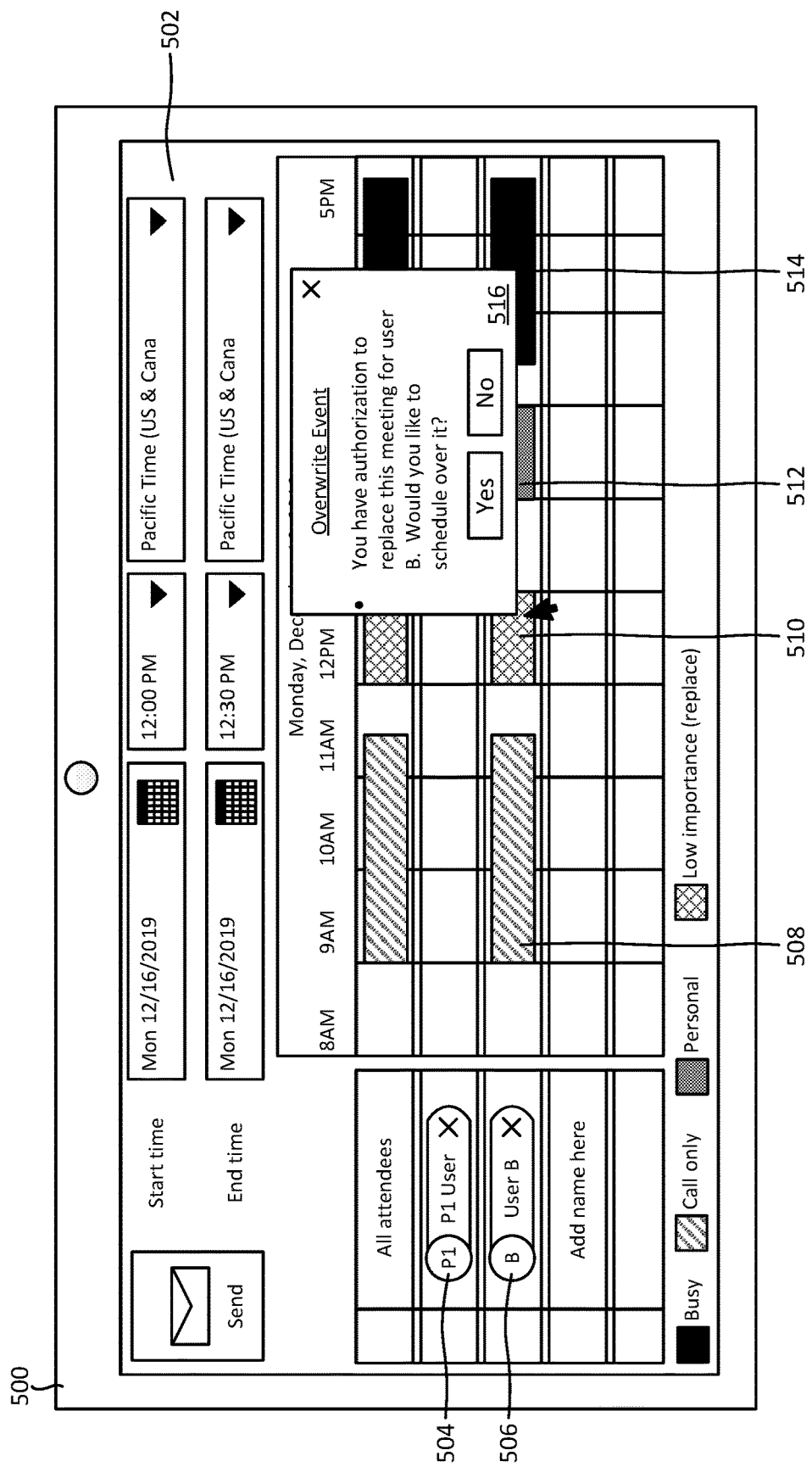
FIG. 5 illustrates a computing device displaying an electronic scheduling assistant associated with an organizer user that has a high importance level relationship with an invitee user and access to displace calendar events.

FIG. 5 illustrates a computing device 500 displaying an electronic scheduling assistant 502 associated with an organizer user that has a high importance level relationship with an invitee user and access to displace calendar events from the invitee's electronic calendar. The electronic scheduling assistant 502 includes a display of typical work hours for a day that the organizer user is attempting to schedule a meeting with user B. That day is Monday, Dec. 16, 2019. Scheduling assistant 502 also includes the time that the organizer user is attempting to schedule the meeting with the invitee user. That time is from 12:00 PM to 12:30 PM. The organizer user is indicated on scheduling assistant 502 by organizer user icon 504, which for exemplary purposes includes the user's category designation (P1) (most trusted/most access). Below organizer user icon 504 is invitee user icon 506, which corresponds to user B (the user that has provided P1 level access to the organizer user). To the right of each of those respective icons is event information for each respective user on Monday, Dec. 16, 2019.

The event information displayed on the organizer user's electronic scheduling assistant 502 includes information that user B has provided the organizer with access to. Electronic scheduling assistant 502 also includes an event type key on the lower portion of the display, which indicates that there are four types of event classifications that may be displayed and indicated via scheduling assistant 502. Those event classifications are: (1) busy, (2) call only, (3) personal, and (4) low importance (replace). The low importance (replace) event classification may indicate that the importance of a meeting and/or the attendees is relatively low compared to an organizer user and that an organizer user may replace the meeting if she desires. The low importance (replace) event classification may be dynamic in nature and determined and/or assigned to an event for each organizer user based on that user's importance level and/or importance score to the corresponding invitee user. Additionally, the low importance (replace) event classification may be determined and/or assigned to an event based on one or more additional factors such as recurring weekly meetings have less priority than non-recurring meetings, and/or contextual signals from one or more of: a meeting agenda, body of a meeting invite, meeting invite attachment, and/or meeting title identified via natural language processing and/or keyword matching.

In this example, the organizer user's electronic scheduling assistant displays all of the events for the invitee's (user B) day, as well as the event-type classification for each of those events. In some examples, if the invitee had designated the organizer user with a lower category designation (e.g., P2, P3), the event-type classification information may not have been made available to the organizer user (e.g., the organizer user's scheduling assistant 502). However, because the invitee user has designated the organizer user as P1 (most trusted/most access), that information is relayed via scheduling assistant 502. Thus in this example, user B's schedule shows first event 508 between 9 AM and 11:30 AM and the corresponding event classification for "call only", second event 510 between 12 PM and 1 PM and the corresponding event classification "low importance (replace)", third event 512 between 2 PM and 3 PM and the corresponding event classification for "personal", and fourth event 514 between 3:30 PM and 5:30 PM and the corresponding event classification for "busy".

In this example, pop-up window 516 has been surfaced over scheduling assistant 502. Pop-up window 516 may have been automatically surfaced when the organizer user added user B as an invitee. In other examples, pop-up window 516 may be surfaced when an action is taken in the scheduling of the meeting (e.g., send element is selected, the time for the meeting is selected, etc.). Pop-up window 516 includes a selectable option to schedule over an existing meeting on the invitee's calendar. Specifically, pop-up window 516 states: "Overwrite Event—You have authorization to replace this meeting for user B. Would you like to schedule over it?" In this example, the cross-domain calendar application service has caused this option to be surfaced based partially on the P1 designation of the organizer user and the sharing of the event classification for third event 512. That is, the organizer user (and the meeting that is being scheduled) is determined to be more important than third event 512, and as such given the organizer user's calendar permissions and that information, the cross-domain calendar application service and/or scheduling assistant 502 may automatically surface the overwrite event prompt. In examples, for the new meeting to replace the existing meeting on the invitee's calendar, the invitee user may have to accept the new meeting despite the organizer user selecting to overwrite the existing meeting.

In additional examples, when a high priority user (e.g., the P1 organizer user) views the calendar of the corresponding invitee, the cross-domain calendar application service may automatically move and/or not surface lower priority events in the calendar such that the organizer user can freely book those times with the invitee user. In such examples, second event 510 may simply not be displayed and pop-up window 516 may not be surfaced.

Figure 6:
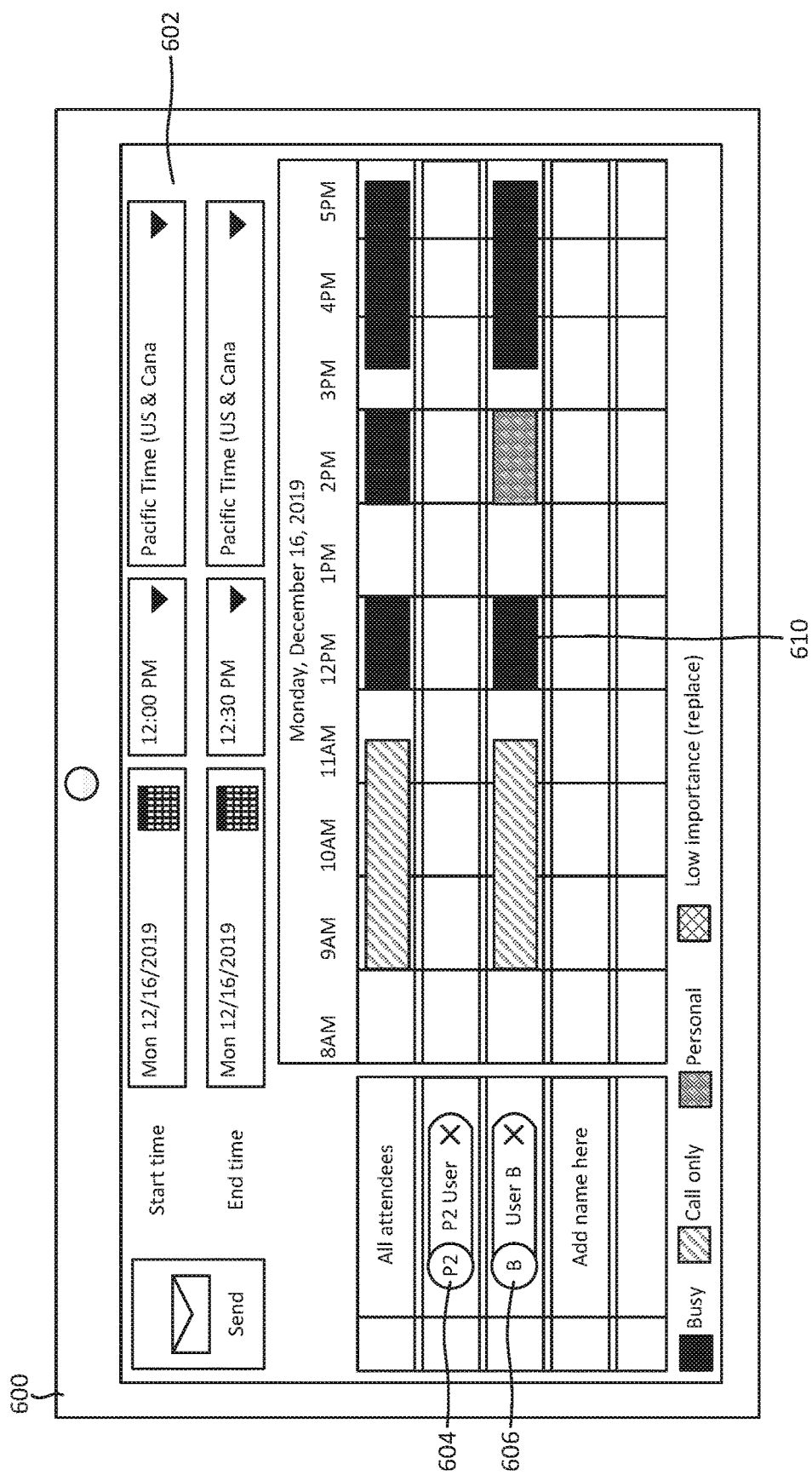
FIG. 6 illustrates a computing device displaying an electronic scheduling assistant associated with an organizer user that has a medium importance level relationship with an invitee user.

FIG. 6 illustrates a computing device 600 displaying an electronic scheduling assistant 602 associated with an organizer user that has a medium importance level relationship with an invitee user. The electronic scheduling assistant 602 includes a display of typical work hours for a day that the organizer user is attempting to schedule a meeting with user B. That day is Monday, Dec. 16, 2019. Scheduling assistant 602 also includes the time that the organizer user is attempting to schedule the meeting with the invitee user. That time is from 12:00 PM to 12:30 PM. The organizer user is indicated on scheduling assistant 602 by organizer user icon 604, which for exemplary purposes includes the user's category designation (P2) (moderate trust/moderate access). Below organizer user icon 604 is invitee user icon 606, which corresponds to user B (the user that has provided P2 level access to the organizer user). To the right of each of those respective icons is event information for each respective user on Monday, Dec. 16, 2019.

The event information displayed on the organizer user's electronic scheduling assistant 602 includes information that user B has provided the organizer with access to. Electronic scheduling assistant 602 also includes an event type key on the lower portion of the display, which indicates that there are four types of event classifications that may be displayed and indicated via scheduling assistant 702. Those event classifications are: (1) busy, (2) call only, (3) personal, and (4) low importance (replace). The low importance (replace) event classification may indicate that the importance of a meeting and/or the attendees is relatively low compared to an organizer user and that an organizer user may replace the meeting if she desires. The low importance (replace) event classification may be dynamic in nature and determined and/or assigned to an event for each organizer user based on that user's importance level and/or importance score to the corresponding invitee user. Additionally, the low importance (replace) event classification may be determined and/or assigned to an event based on one or more additional factors such as recurring weekly meetings have less priority than non-recurring meetings, and/or contextual signals from one or more of: a meeting agenda, body of a meeting invite, meeting invite attachment, and/or meeting title identified via natural language processing and/or keyword matching.

In this example, the organizer user's electronic scheduling assistant 602 displays all of the events for the invitee's (user B) day, as well as the event-type classification for each of those events. In this example, unlike the previous examples, second event 610 simply has a "busy" event classification associated with it rather than a "low importance (replace)" event classification associated with it. That is, in this example, because the organizer user has a lower category designation P2 in relation to the invitee user, the second event 610 is not indicated as being unimportant and replaceable by the organizer user.

Figure 7:
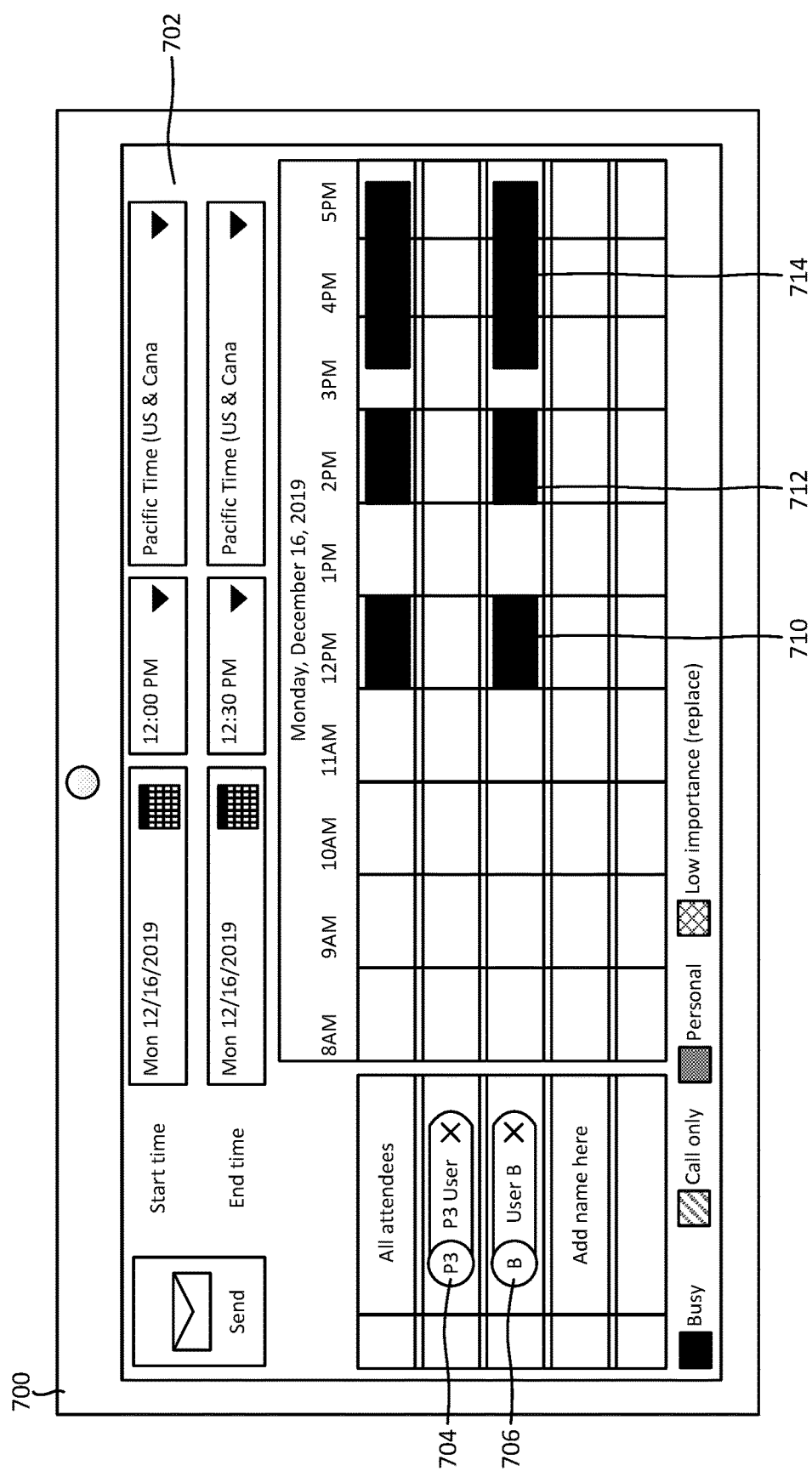
FIG. 7 illustrates a computing device displaying an electronic scheduling assistant associated with an organizer user that has a low importance level relationship with an invitee user.

FIG. 7 illustrates a computing device 700 displaying an electronic scheduling assistant 702 associated with an organizer user that has a low importance level relationship with an invitee user. The electronic scheduling assistant 702 includes a display of typical work hours for a day that the organizer user is attempting to schedule a meeting with user B. That day is Monday, Dec. 16, 2019. Scheduling assistant 702 also includes the time that the organizer user is attempting to schedule the meeting with the invitee user. That time is from 12:00 PM to 12:30 PM. The organizer user is indicated on scheduling assistant 702 by organizer user icon 704, which for exemplary purposes includes the user's category designation (P3) (low trust/low access). Below organizer user icon 704 is invitee user icon 706, which corresponds to user B (the user that has provided P3 level access to the organizer user). To the right of each of those respective icons is event information for each respective user on Monday, Dec. 16, 2019.

The event information displayed on the organizer user's electronic scheduling assistant 702 includes information that user B has provided the organizer with access to. Electronic scheduling assistant 702 also includes an event type key on the lower portion of the display, which indicates that there are four types of event classifications that may be displayed and indicated via scheduling assistant 702. Those event classifications are: (1) busy, (2) call only, (3) personal, and (4) low importance (replace). The low importance (replace) event classification may indicate that the importance of a meeting and/or the attendees is relatively low compared to an organizer user and that an organizer user may replace the meeting if she desires. The low importance (replace) event classification may be dynamic in nature and determined and/or assigned to an event for each organizer user based on that user's importance level and/or importance score to the corresponding invitee user. Additionally, the low importance (replace) event classification may be determined and/or assigned to an event based on one or more additional factors such as recurring weekly meetings have less priority than non-recurring meetings, and/or contextual signals from one or more of: a meeting agenda, body of a meeting invite, meeting invite attachment, and/or meeting title identified via natural language processing and/or keyword matching.

In this example, the organizer user's electronic scheduling assistant 702 only surfaces the three events for user B. Additionally, rather than indicating additional details about third event 712, all of the events (second event 710, third event 712, fourth event 714) are simply indicated as user B being busy during those periods of time. That is, because the organizer user has a relatively low category designation (P3), there are not as many event details from user B's calendar that are shared.

Figure 8:
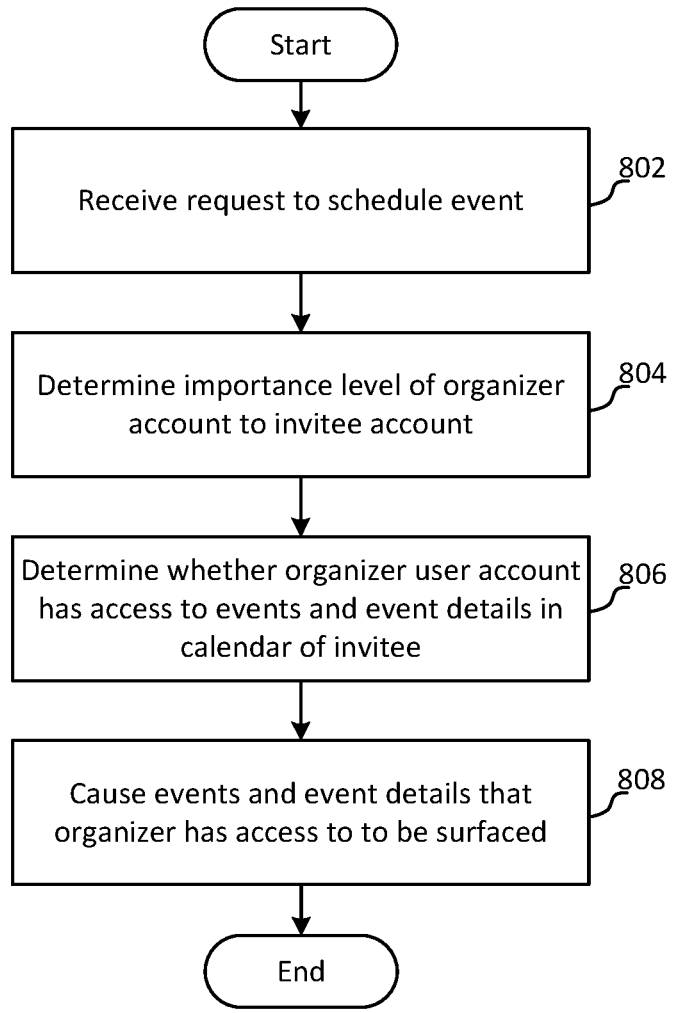
FIG. 8 is an exemplary method for providing cross-domain access to calendar content.

FIG. 8 is an exemplary method for providing cross-domain access to calendar content. The method 800 begins at a start operation and flow moves to operation 802.

At operation 802 a request to schedule an event is received. The request may comprise an identity of an organizer user account, the organizer user account being associated with a first domain. The first domain may be an email domain and/or an organizational domain. The request may additionally comprise an identity of an invitee user account, the invitee user account associated with a second domain. The second domain may be an email domain and/or an organizational domain. In some examples, the request may be made via an event scheduling assistant associated with a calendar application. The request may originate from a computing device associated with the organizer user account. In other examples, the request may be made via a different mechanism, such as an email request, a separate permissions user interface, etc.

From operation 802 flow continues to operation 804 where an importance level of the organizer user account to the invitee user account is determined. In some examples, the determination may be made based on analyzing collaboration signals between the organizer user account and the invitee user account. The collaboration signals may comprise: a frequency of electronic communications between the organizer user account and the invitee user account; a number of electronic communications between the organizer user account and the invitee user account; a number of identified meetings between the organizer user account and the invitee user account; and/or a frequency of identified meetings between the organizer user account and the invitee user account. In other examples, the importance level may be determined based on a hierarchical position of the organizer and/or invitee in their respective organizations. In still other examples, the determination may be made based on a relative closeness based on analyzing one or more social media/connection graphs and/or professional media/connection graphs. In additional examples, the determination may be made based on an identified relationship between users (e.g., customer/sales relationship, personal relationship, colleague relationship, etc.).

From operation 804 flow continues to operation 806 where a determination is made based on the determined importance level as to whether the organizer user account has access to each of a plurality of events in an electronic calendar associated with the invitee user account. In some examples, a determination may be made based on the determined importance level as to whether the organizer user account has access to each of a plurality of event details. In some examples, the determined importance level may correspond to a tier that has access rights associated with it. For example, a low tier may have limited calendar access (e.g., only show what times a user is free and busy), a medium tier may have medium calendar access, and a high tier may have substantial calendar access. The event details may comprise names of scheduled events, times of scheduled events, event types (e.g., personal, business), locational info associated with events, and relative importance of events to an invitee, for example.

From operation 806 flow continues to operation 808 where one or more events and associated event details that the organizer user account has access to from the electronic calendar associated with the invitee user account are caused to be surfaced in an event scheduling assistant user interface associated with the organizer user account.

From operation 808 flow moves to an end operation and the method 800 ends.

Figure 9:
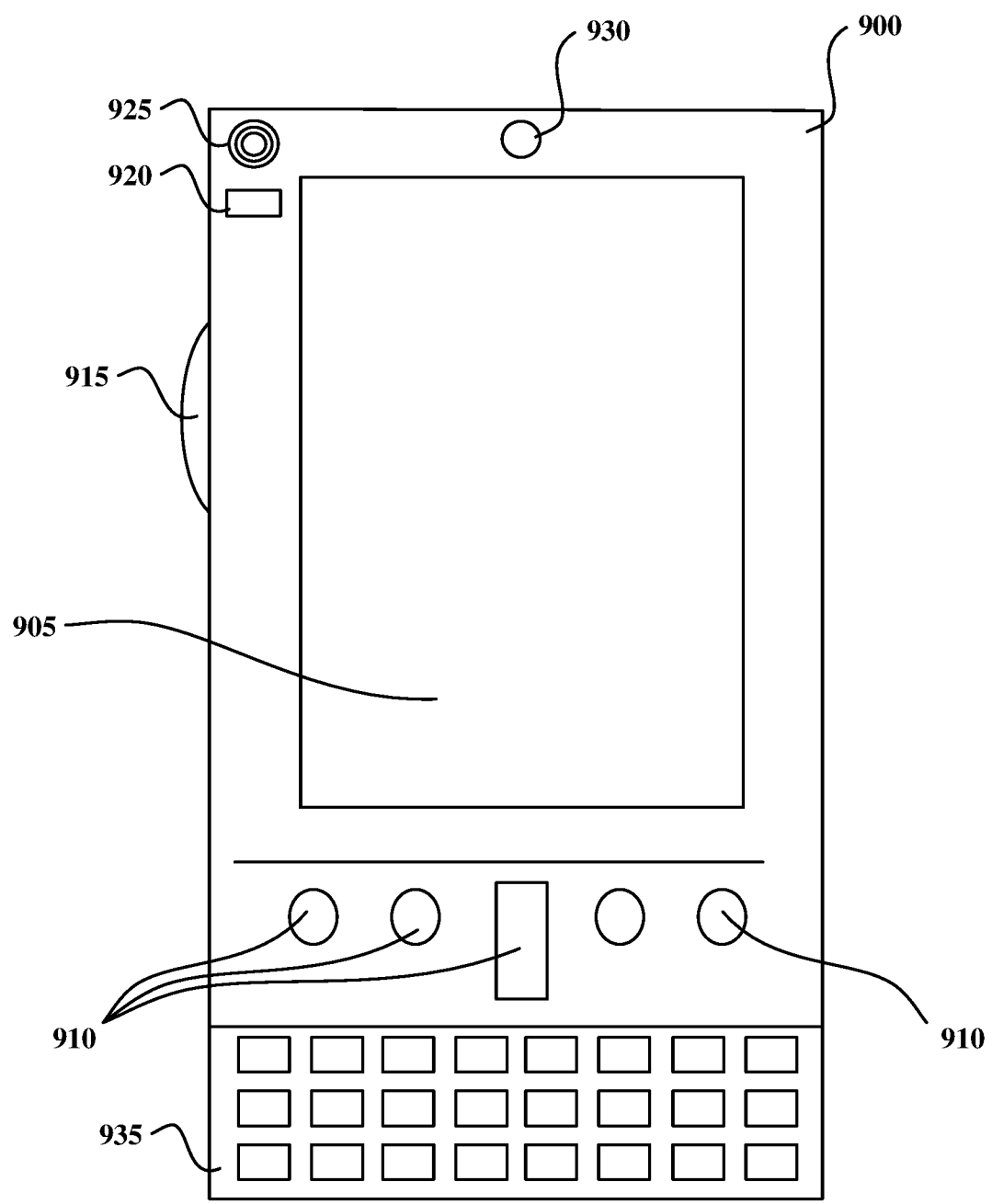
FIGS. 9 and 10 are simplified diagrams of a mobile computing device with which aspects of the disclosure may be practiced.
Figure 10:
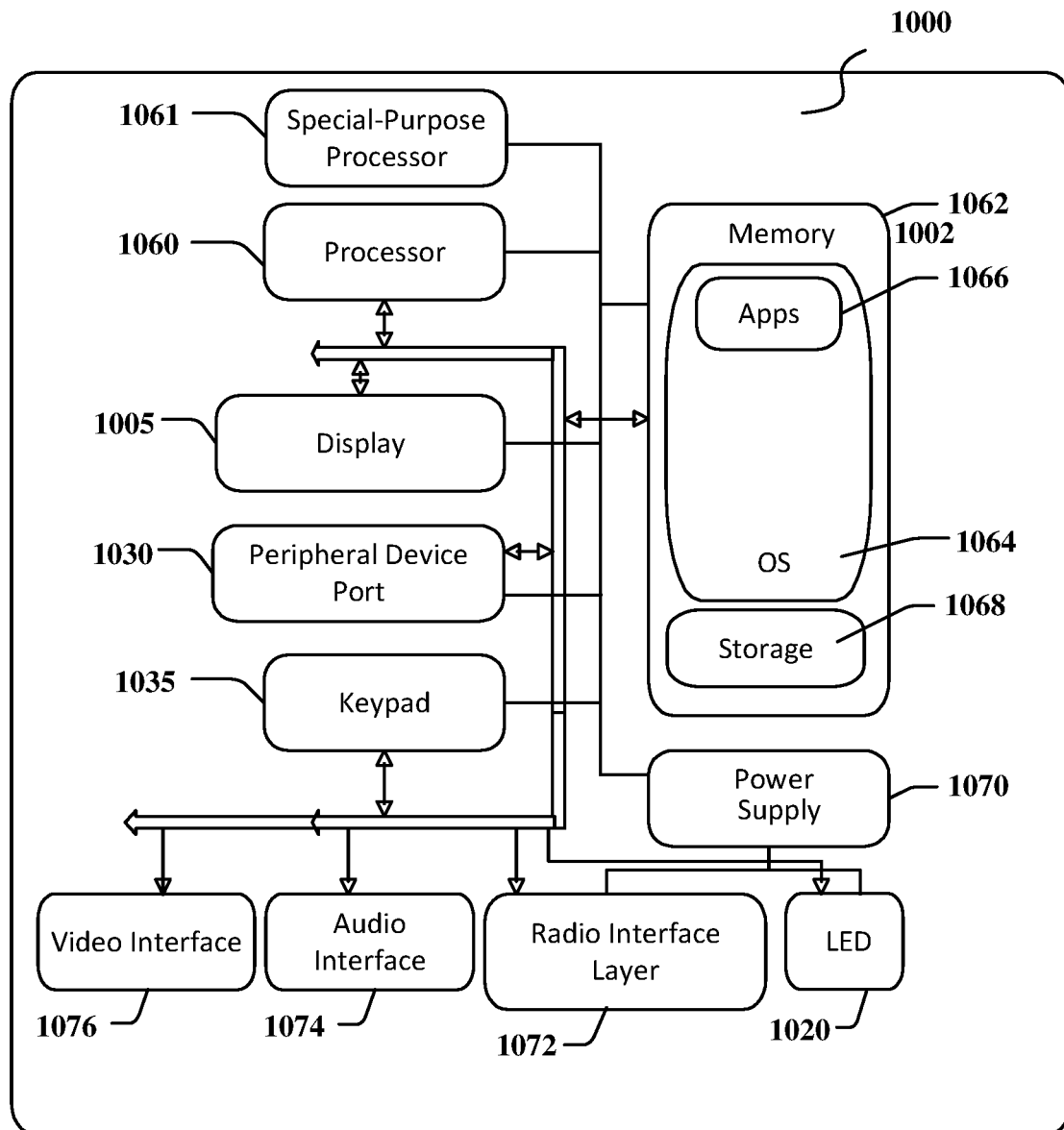

FIGS. 9 and 10 illustrate a mobile computing device 900, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 9, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or fewer input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 10 is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000, including instructions for providing and operating a cross-domain calendar platform.

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 920 may be used to provide visual notifications, and/or an audio interface 1074 may be used for producing audible notifications via the audio transducer 925. In the illustrated embodiment, the visual indicator 920 is a light emitting diode (LED) and the audio transducer 925 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 925, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 930 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10 by the non-volatile storage area 1068. The mobile computing device 1000 may include a special-purpose processor 1061, a display 1005, a peripheral device port 1030, a keypad 1035, and/or an LED 1020.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
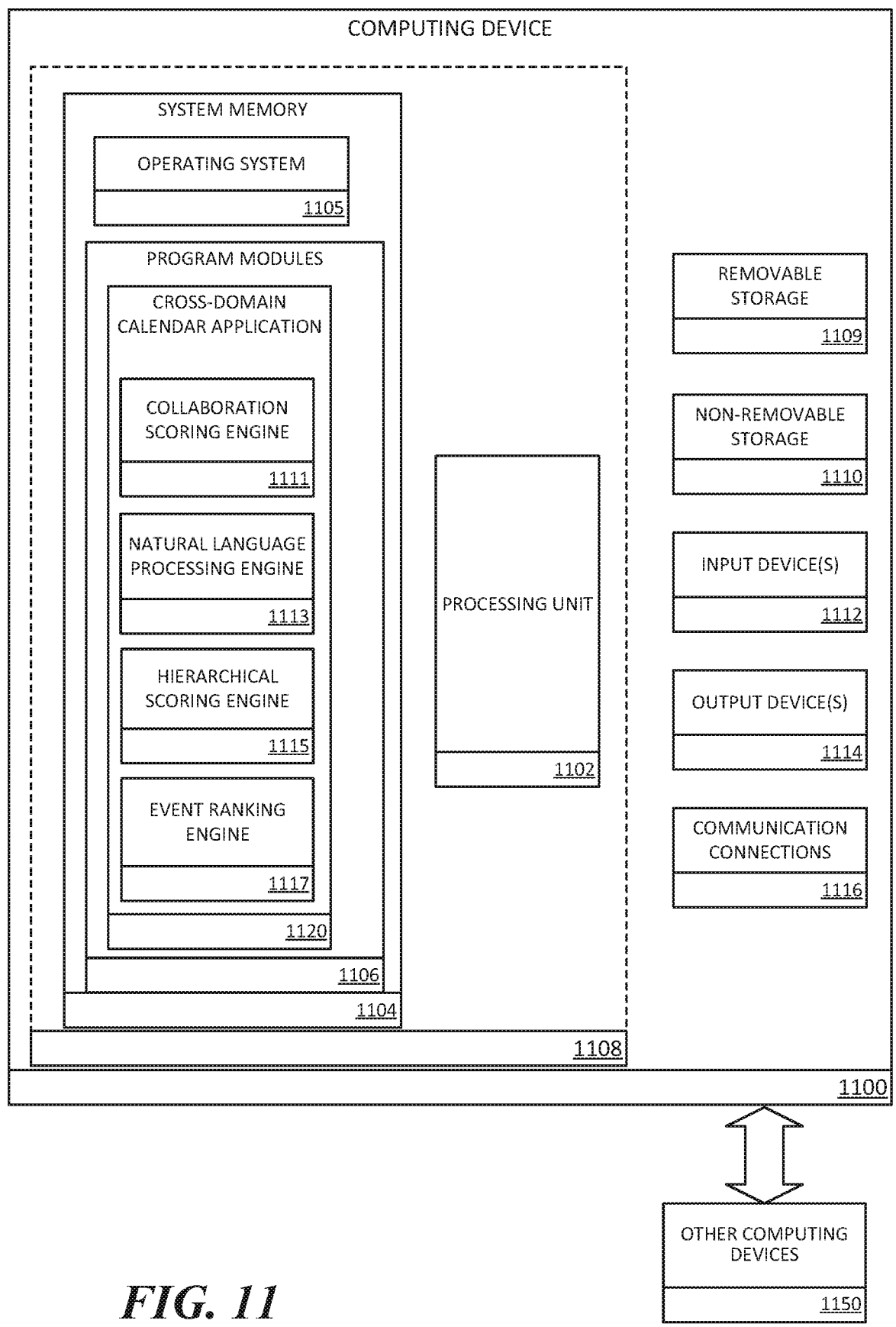
FIG. 11 is a block diagram illustrating example physical components of a computing device with which aspects of the disclosure may be practiced.

FIG. 11 is a block diagram illustrating physical components (e.g., hardware) of a computing device 1100 with which aspects of the disclosure may be practiced. The computing device components described below may have computer executable instructions for assisting with cross-domain calendar access and sharing. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 suitable for running one or more cross-domain calendar applications and/or services. The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., cross-domain calendar application 1120) may perform processes including, but not limited to, the aspects, as described herein. According to examples, collaboration scoring engine 1111 may perform one or more operations associated with calculating a score between two user accounts based on communications and/or meetings that include both of those user accounts. Natural language processing engine 1113 may perform one or more operations associated with applying natural language processing models to meeting invites, attachments, agendas and related materials to identify an importance associated with those meetings/events. Hierarchical scoring engine 1115 may perform one or more operations associated with determining a hierarchical position in an organization of a first user associated with a first domain and/or a second user associated with a second domain and generating one or more importance scores based on those determinations. Event ranking engine 1117 may perform one or more operations associated with ranking events based on importance to determine whether a first event can be scheduled over a second event.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12:
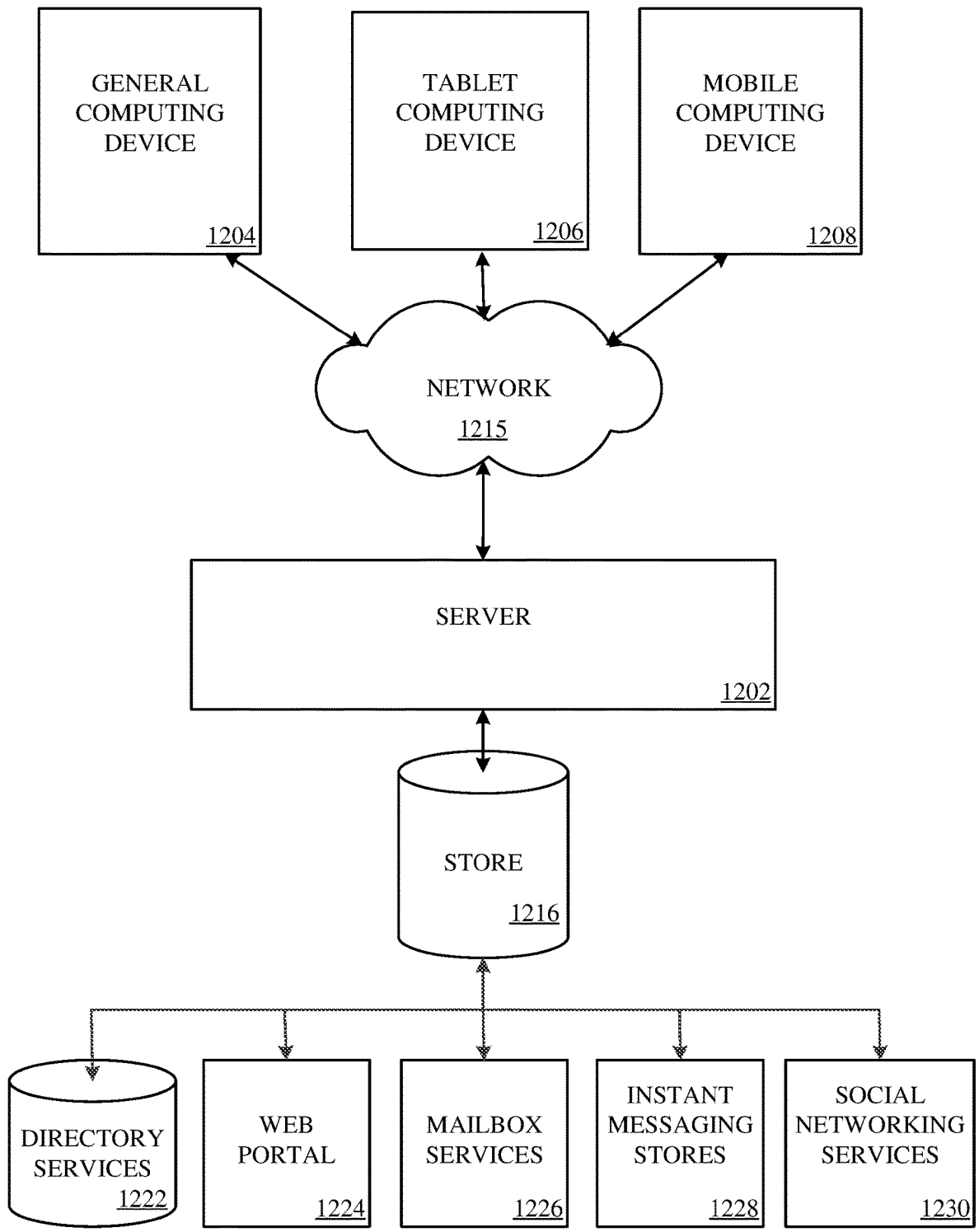
FIG. 12 is a simplified block diagram of a distributed computing system in which aspects of the present disclosure may be practiced.

FIG. 12 illustrates one aspect of the architecture of a system for processing data received at a computing system from a remote source, such as a personal/general computer 1204, tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking site 1230. The program modules 1106 may be employed by a client that communicates with server device 1202, and/or the program modules 1106 may be employed by server device 1202. The server device 1202 may provide data to and from a client computing device such as a personal/general computer 1204, a tablet computing device 1206 and/or a mobile computing device 1208 (e.g., a smart phone) through a network 1215. By way of example, the computer systems described herein may be embodied in a personal/general computer 1204, a tablet computing device 1206 and/or a mobile computing device 1208 (e.g., a smart phone). Any of these embodiments of the computing devices may obtain content from the store 1216, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for providing cross-domain access to calendar availability, the computer-implemented method comprising:
   receiving a request to schedule an event, the request comprising: an identity of an organizer user account, the organizer user account associated with a first domain, and an identity of an invitee user account, the invitee user account associated with a second domain;
   generating, by a first token security authorization entity, a token describing the organizer user account;
   authenticating, by a second token security authorization entity, the token describing the organizer user account with an authorization sent from a device associated with the invitee user account for the organizer user account to access electronic calendar information associated with the invitee user account;
   providing the organizer user account with access to the electronic calendar information associated with the invitee user account based on the authentication;
   determining an importance level of the organizer user account to the invitee user account;
   determining, based on the importance level, that the organizer user account has access to an event in an electronic calendar associated with the invitee user account;
   determining whether the event is a recurring meeting;

determining, based at least in part on the determination of whether the event is a recurring meeting, a relative importance of the event compared to the organizer user account;

and causing the event to be surfaced in an event scheduling assistant user interface associated with the organizer user account, wherein the event is surfaced with an indication corresponding to the relative importance of the event compared to the organizer user account.

2. The computer-implemented method of claim 1, wherein the importance level is one of a plurality of levels, each of the plurality of levels associated with a different set of access rights to an electronic calendar.

3. The computer-implemented of claim 2, wherein the importance level is based on an importance score that is calculated based on a plurality of collaboration signals associated with the organizer user account and the invitee user account.

4. The computer-implemented method of claim 3, wherein the collaboration signals comprise two or more of: a frequency of electronic communications between the organizer user account and the invitee user account; a number of electronic communications between the organizer user account and the invitee user account; a number of identified meetings between the organizer user account and the invitee user account; and a frequency of identified meetings between the organizer user account and the invitee user account.

5. The computer-implemented method of claim 1, wherein the importance level is based on a hierarchical position of the organizer user account in an organization associated with the first domain.

6. The computer-implemented method of claim 2, wherein a first level of the plurality of levels provides access to: dates and times that the invitee user account has an event scheduled in the electronic calendar associated with the invitee user account.

7. The computer-implemented method of claim 1, wherein: in determining whether the event is a recurring meeting a determination is made that the event is a recurring meeting; the determined relative importance is a lower importance than a non-recurring meeting based on the event being a recurring meeting; and the indication corresponding to the relative importance of the event compared to the organizer account is a lower importance indication based on the event being a recurring meeting.

8. The computer-implemented method of claim 1, wherein: in determining whether the event is a recurring meeting a determination is made that the event is a non-recurring meeting; the determined relative importance is higher than for recurring meetings; and the indication corresponding to the relative importance of the event compared to the organizer user account is higher than for recurring meetings based on the event being a non- recurring meeting.

9. The computer-implemented method of claim 1, wherein:

determining the relative importance of the event compared to the organizer user account further comprises applying a natural language processing model to one or more contextual signals comprising: a meeting agenda, a body of a meeting invite, a meeting invite attachment, and a meeting title.

10. A system for providing cross-domain access to calendar availability, comprising: a memory for storing executable program code; and one or more processors, functionally coupled to the memory, the one or more processors being responsive to computer-executable instructions contained in the program code and operative to:

receive a request to schedule an event, the request comprising: an identity of a requestor user account, the requestor user account associated with a first domain, and an identity of a requestee user account, the requestee user account associated with a second domain generate, by a first token security authorization entity, a token describing the requestor user account;

authenticate, by a second token security authorization entity, the token describing the requestor user account with an authorization sent from a device associated with the requestee user account for the requestor user account to access electronic calendar information associated with the requestee user account;

provide the requestor user account with access to the electronic calendar information associated with the requestee user account based on the authentication;

determine an importance level of the requestor user account to the requestee user account;

determine, based on the importance level, that the requestor user account has access to an event in an electronic calendar associated with the requestee user accounts determine whether the event is a recurring meeting;

determine, based at least in part on the determination of whether the event is a recurring meeting, a relative importance of the event compared to the requestor user account;

and cause the event to be surfaced in an email application user interface associated with the requestor user account, wherein the event is surfaced with an indication corresponding to the relative importance of the event compared to the requestor user account.

11. The system of claim 10, wherein the importance level is one of a plurality of levels, each of the plurality of levels associated with a different set of access rights to an electronic calendar.

12. The system of claim 11, wherein the importance level is based on an importance score that is calculated based on a plurality of collaboration signals associated with the requestor user account and the requestee user account.

13. The system of claim 12, wherein the collaboration signals comprise two or more of: a frequency of electronic communications between the requestor user account and the requestee user account; a number of electronic communications between the requestor user account and the requestee user account; a number of identified meetings between the requestor user account and the requestee user account; and a frequency of identified meetings between the requestor user account and the requestee user account.

14. The system of claim 10, wherein the importance level is based on a hierarchical position of the requestor in an organization associated with the first domain.

15. A computer-readable storage device comprising executable instructions that, when executed by one or more processors, assist with providing cross-domain access to calendar availability, the computer-readable storage device including instructions executable by the one or more processors for:

receiving a request to schedule an event, the request comprising: an identity of an organizer user account, the organizer user account associated with a first domain, and an identity of an invitee user account, the invitee user account associated with a second domain;

generating, by a first token security authorization entity, a token describing the organizer user account;

authenticating, by a second token security authorization entity, the token describing the organizer user account with an authorization sent from a device associated with the invitee user account for the organizer user account to access electronic calendar information associated with the invitee user account;

providing the organizer user account with access to the electronic calendar information associated with the invitee user account based on the authentication;

determining an importance level of the organizer user account to the invitee user account;

determining, based on the importance level, that the organizer user account has access to an event in an electronic calendar associated with the invitee user account;

determining whether the event is a recurring meeting;

determining, based at least in part on the determination of whether the event is a recurring meeting, a relative importance of the event compared to the organizer user account;

and causing the event to be surfaced in an event scheduling assistant user interface associated with the organizer user account, wherein the event is surfaced with an indication corresponding to the relative importance of the event compared to the organizer user account.

16. The computer-readable storage device of claim 15, wherein the importance level is one of a plurality of levels, each of the plurality of levels associated with a different set of access rights to an electronic calendar.

17. The computer-readable storage device of claim 16, wherein the importance level is based on an importance score that is calculated based on a plurality of collaboration signals associated with the organizer user account and the invitee user account.

18. The computer-readable storage device of claim 17, wherein the collaboration signals comprise two or more of: a frequency of electronic communications between the organizer user account and the invitee user account; a number of electronic communications between the organizer user account and the invitee user account; a number of identified meetings between the organizer user account and the invitee user account; and a frequency of identified meetings between the organizer user account and the invitee user account.

19. The computer-readable storage device of claim 15, wherein the importance level is based on a hierarchical position of the organizer in an organization associated with the first domain.

20. The computer-readable storage device of claim 15, wherein the determined importance level allows the organizer user account to displace an existing event on the electronic calendar associated with the invitee user account.

* * * * *